United States Patent [19]
Dunn

[11] Patent Number: 4,763,842
[45] Date of Patent: Aug. 16, 1988

[54] WATER DRIP DEVICE FOR IRRIGATION

[75] Inventor: David C. Dunn, Guthrie, Okla.

[73] Assignee: Bill D. McCarthy, Oklahoma City, Okla.

[21] Appl. No.: 10,753

[22] Filed: Feb. 4, 1987

[51] Int. Cl.⁴ .................. B05B 15/00; B05B 1/20
[52] U.S. Cl. ............................ 239/542; 239/547; 239/566
[58] Field of Search ............. 239/269, 542, 547, 569, 239/566, 590; 138/40, 41

[56] References Cited

U.S. PATENT DOCUMENTS

| | | | |
|---|---|---|---|
| 2,566,833 | 9/1951 | Healy | 239/547 X |
| 4,047,995 | 9/1977 | Leal-Diaz | 239/542 X |
| 4,626,130 | 12/1986 | Chapin | 239/542 |

FOREIGN PATENT DOCUMENTS 24622 3/1981 European Pat. Off. ............ 239/242

Primary Examiner—Andres Kashnikow
Assistant Examiner—Patrick N. Burkhart
Attorney, Agent, or Firm—Bill D. McCarthy

[57] ABSTRACT

A water drip device used for providing intermittent or continuous watering of row crops, such as vegetables, fruits and other plants and enhancing crop growth. The water drip device is made of plastic tape adapted for burial along the length of a crop row. One end of the device is connected to a main water supply source, and the device is constructed to provide water at a reduced water pressure so that water drips or weeps into the ground adjacent a plant or plant seed to avoid soil erosion and plant damage.

7 Claims, 1 Drawing Sheet

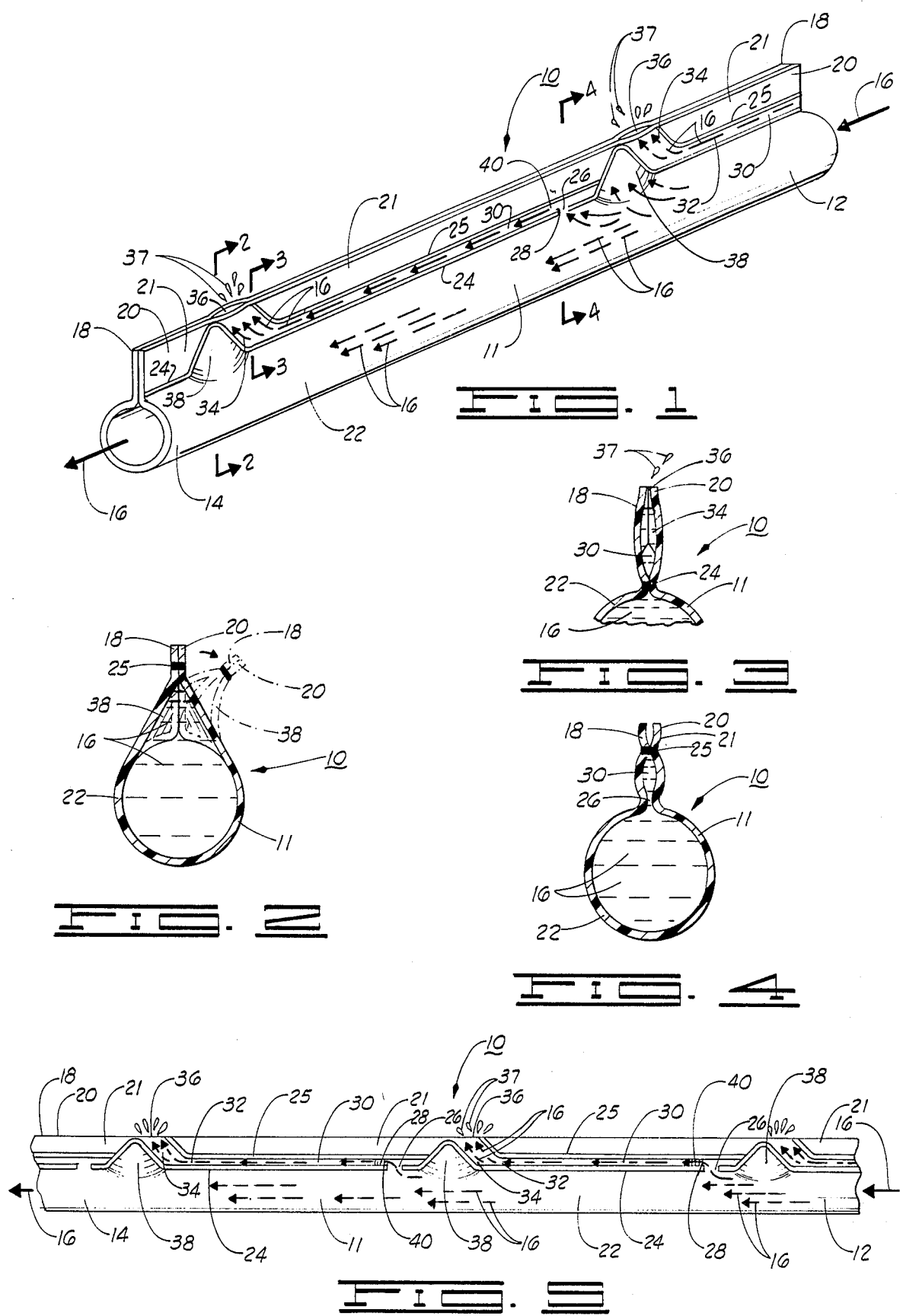

WATER DRIP DEVICE FOR IRRIGATION

BACKGROUND OF THE INVENTION

1. Field of Invention

The present invention relates to a watering device for drip feeding water to row crops and more particularly but not by way of limitation, to disposable plastic tape sealed to include a water supply channel for connection to a pressurized water source.

2. Discussion

With the advent of high-strength, flexible and light weight plastics developed in recent years the agriculture industry has begun to use plastic tubing buried in the ground for watering row crops. This type of irrigation reduces the amount of water required for watering crops along with reduced water evaporation. Because of the continuing shortage of water for irrigation, particularly in the Western United States, any means of improved crop watering is welcomed by the farmer. Also, plant growth is enhanced since water is introduced adjacent a plant seed or crop root. Prior art water supply hoses, because of their particular design, can under some conditions, allow water to squirt outwardly from spaced apart outlets causing soil erosion. Also this squirting of water can cause crop damage when introduced next to the plant.

One type of prior art row crop watering device includes a plastic supply hose having a separate regulating tube integrally formed along the length of the hose. The tube includes a water filter mounted therein and spaced apart water outlets in the side of the tube for discharging the water into the soil. Another watering device includes a supply tube with a second water pressure tube extruded therein and forming a bi-wall configuration. Water under pressure is received from the supply tube into the pressure tube and exits the device through openings along the sides of the pressure tube. It has been found that water tends to squirt outwardly from the pressure tube using this type of watering device. Both such prior art watering devices are also subject to water flow stoppage due to crimping or crushing by ground conditions, and further, for stoppage due to contaminants in the water supply.

The row crop watering device of the present invention, using plastic tape, eliminates the above-mentioned problem of outwardly squirting of water under pressure and features additional improvements in the watering of plants described herein including self cleaning capability.

SUMMARY OF THE INVENTION

The present invention provides a water drip device for irrigating row crops and the like and which is adapted for connection to a water source. The water drip device, devised to be buried in soil adjacent plants or plant seeds, comprises an elongated supply channel having at least one water inlet therein which communicates with an elongated pressure channel. A diffuser cavity communicates with the distal end and has a water outlet disposed to drip or weep, irrigating water into the surrounding soil.

A vertical stabilizing cavity is disposed in the top of the supply channel, and under pressure expands to stiffen or strengthen the water drip device along its length for uprighting and maintaining the integrity of the water inlet and outlet for water passage there through.

An object of the present invention is to provide an inexpensive yet highly effective water drip device of the type buried along side row crops or the like.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a section of the watering device in a perspective view.

FIG. 2 illustrates a cross-sectional view of the supply channel and vertical stabilizer cavity taken along lines 2—2 shown in FIG. 1.

FIG. 3 illustrates a cross-sectional view of the pressure channel and diffuser cavity taken along lines 3—3 shown in FIG. 1.

FIG. 4 illustrates a cross-sectional view of the supply channel, pressure channel and water inlet taken along lines 4—4 shown in FIG. 1.

FIG. 5 illustrates a front view of a section of the watering device with the flow of pressurized water shown in dotted lines and water droplets exiting from water outlets in the top of the device.

DESCRIPTION

The watering device of the present invention can be made of lightweight, high-strength plastic tape, plastic tube, or similar materials. The material used is inexpensive and can be plowed under at the end of the growing season or reused depending on its application. In a typical application the watering device is buried during the planting of row crops such as fruits, vegetables and other plants. Other applications of the device are the watering of orchards, vineyards and landscapes.

Through the use of spaced apart pressure channels and water diffuser cavities in the device, the water pressure of the device is reduced prior to water exiting out water outlets. Therefore, water is introduced into the soil in droplets or weeps therein rather than squirting outwardly, thereby eliminating soil erosion and possible crop damage.

The watering device can be constructed so that the pressure channels and diffuser cavities are spaced equally along the length of the supply channel with the spacing corresponding with the spacing between the individual plants or planted seeds. Spacing can vary by way of example only, from 8, 12, 16, and 24 inches or greater with working water pressure from 2 to 8 psi. Further, the length and width of the pressure channel and diffuser cavity can be adjusted depending on the water pressure received in the supply channel so that any chance of water squirting is reduced and eliminated.

As described more fully hereinbelow, the present watering device also includes vertical stabilizer cavities along the length thereof that receive water under pressure from the supply channel to strengthen the water device so as to hold the pressure channels and diffuser cavities upright for drip feeding the water into the soil. When the water pressure is relieved in the vertical stabilizer cavities, vertical flaps forming the stabilizer cavities, diffuser cavities and pressure channels can rotatingly fold from the vertical, thereby preventing soil from blocking the water inlets and outlets formed between adjacent sides of the flap. Further, because of a certain amount of elasticity of the flap sides, the water outlets are closed while the water pressure is relieved. This closing of the water outlets helps reduce possible dirt contamination into the diffuser cavities.

In FIG. 1 a portion of a water drip device of the present invention is shown and designated by general reference numeral 10. While the device 10 is discussed herein as made of lightweight, high-strength flat plastic tape 11, it should be appreciated that the device can be made equally well with pliable plastic tubing or similar materials without departing from the scope of the invention. The device 10 includes a first end portion 12 and a second end portion 14. The first end portion 12, while not shown in the drawings, is connected to a water supply source for receiving water under pressure. The water in the drawings indicated by arrows and lines all having numeral 16. Also, as the device 10 is extended over great lengths, such as in row crop applications, both end portions 12 and 14 can be connected to the water supply source to prevent water pressure loss.

When using plastic tape 11, it is folded in half with sides 18 and 20 extending upwardly and joined together to form a vertical flap 21. The sides 18 and 20 are joined together as shown by first and second seal lines 24 and 25 formed by heat, ultrasonics, an adhesive or any other commonly used manner of securing together thermoplastic materials. The lower half of the tape 11 is thus formed into an elongated supply channel 22 with the first seal line 24 extending along the length and the top of the channel 22. As shown in FIG. 1 and FIG. 5, the length of the seal line 24 is interrupted to provide unsealed portions of the line to form water inlets 26. The inlets 26 provide an opening to one end 28 of a pressure channel 30.

The pressure channel 30 while shown parallel to the supply channel 22 can take on various configurations and labyrinth designs for receiving water and reducing water pressure passing therethrough. Also both the pressure channel 30 and supply channel 22 may have various lengths and widths for controlling water pressure. As the water 16 flows through the channel 30 it exits past a second end 32 into an enlarged area herein called a diffuser cavity 34. The cavity 34 also may have various configurations for dissipating water pressure prior to the water 16 being discharged out a water outlet 36 which is an unsealed opening between the sides 18 and 20 of the vertical flap 21. The water 16 is discharged out the outlet 36 as droplets 37.

Adjacent the diffuser cavity 34—formed between the sides 18 and 20 of the vertical flap 21 and by curving the first seal line 24 upward toward the top of the flap 21 and then downwardly in an inverted "V" shape—is a vertical stabilizer cavity 38. The bottom of the cavity 38 is open to the top of the supply channel 22 for receiving water under pressure therein. FIG. 2, a cross-section of the device 10 taken along lines 2—2 shown in FIG. 1, illustrates the important features of the stabilizer cavity 38. The cavity 38 is pyramidical in shape, although it may have various geometric configurations. When the cavity 38 is filled with water under pressure it holds the vertical flap 21 upright in a vertical position. This prevents the flap 21 from folding over either to the left or right from the vertical and crimping off or restricting water flow through the water inlet 26 and along the pressure channel 30.

It should be noted that the device 10 as shown in the drawings include a plurality of inlets 26, pressure channels 30, diffuser cavities 34, stabilizer cavities 38 and water outlet 36. The drawings do not show the device buried under the ground surface with the water outlets disposed adjacent a plant or plant seed in a row crop application. FIG. 2 shows the top of the flap 21 in dashed lines folded to the right. The elastic nature of the plastic sides 18 and 20 will tend to contract, thereby closing the openings of the outlet 36 when water pressure is relieved and thus thereby preventing dirt contamination therein.

FIG. 3 illustrates a cross-section, taken along lines 3—3 in FIG. 1, of the pressure channel 30 opening into the diffuser cavity 34. The cavity 34 is designed for reducing the water pressure prior to the water 16 exiting between the sides 18 and 20 of the flap 21. Water droplets 37 are shown exiting the water outlet 36. Also shown in this view is the first seal line 24 separating the top of the supply channel 22 from the bottom of the pressure channel 30.

In FIG. 4, a cross-section taken along lines 4—4 in FIG. 1, the supply channel 22 is shown with the water inlet 26 allowing water 16 into the pressure channel 30. In FIG. 4 the plastic tape 11 is clearly shown folded in half with the sides 18 and 20 extending upwardly. The lower portion of the folded tape 11 is used to form the supply channel 22, with the first seal line 24 enclosing the top of the channel 22 except for the equally spaced water inlets 26 disposed along the length of the channel 22. The second seal lines 25 shown in FIG. 4 secure together the top of the pressure channel 30 with the remaining portions of the sides 18 and 20 forming the flap 21.

FIG. 5 illustrates a front view of a section of the device 10. The first seal line 24 extends along the top of the supply channel 22 and parallel to the length of the device 10. The line 24 is interrupted only by the spaced apart water inlets 26, and prior to this interruption, the line curves to form an inverted "V". When the tape 11 is expanded by water pressure received therein, the inverted "V" forms the vertical stabilizer cavity 38 discussed in FIG. 2. The second seal line 25 encloses the top of the pressure channel 30 and curves upwardly to the top of the flap 21. One side of the cavity 38 and the upwardly curve of the second seal line 25 provide the sides of the diffuser cavity 34. While the sealing of the tape 11 is shown using the seal lines 24 and 25, it can be appreciated that the sealing can vary to provide for different dimensions in the supply tube 22, pressure tube 30 and diffuser cavity 34 so that water pressure is reduced sufficiently to insure that the water drip feeds out of the water outlets 36.

In both FIG. 1 and FIG. 5 an in line water filter 40 can be placed adjacent or downstream from the water inlets 26 and inside the pressure channel 30. The filter 40, which can be any suitable material, acts to filter out any contaminates in the water supplied from the supply channel 22 and eliminate possible blockage of the pressure channel 30, diffuser cavity 34 and water outlet 36. And since the water inlet 26 serves as a weep hole which is essentially closed until opened by water pressure, only very small contaminates will be captured by the filter 40 and filte clogging will be minimal.

In operation, the device 10 as shown in the drawings is readily adaptable to various types of watering applications such as row crops, orchards, nurseries, vineyards and landscaping. The spacing of the water outlets 36 can be adjusted during the manufacturing of the device 10 to correspond with the desired plant spacing.

The water flow rate will vary directly with water pressure. Working water pressure is normally 2 to 8 psi. In a row crop application the flat tape 11 can be easily supplied in a roll and unrolled along the length of the row with the water outlets 36 disposed adjacent the plant or plant seed. The tape 11 is buried with one end portion 12 connected to a pressurized water source. Water 16 enters the pressure channel 30 and passes through the filter 40, down the length of the channel 30 and into the diffuser cavity 34. The length of the channel 30 and size of the cavity 34 aid in reducing the pressure of the water so that as the water exits out the water outlets 36 there is a sufficient pressure drop and the water weeps or drips into the surrounding soil. Also, the vertical stabilizer cavities 38 create sufficient stiffness or strength under pressure to cause the device 10 to assume the vertical disposition illustrated in the figures, thereby providing greater integrity of performance.

The device 10 can be used intermittently or continuously depending on the need and type of plants to be watered. Further, since the device is made of high strength plastic material it can be reused; or, since it is inexpensive, it can be plowed under after the growing season and replaced the following year.

Changes may be made in the construction and arrangement of the parts or elements of the embodiments as described herein without departing from the spirit or scope of the invention defined in the following claims.

What is claimed is:

1. A watering device for watering row crops such as fruits, vegetables, plants and similar applications, the device adapted for connection to a water source, the device comprising:

an elongated supply channel formed in the lower portion of a folded plastic tape, the sides of the tape extending and joined together by first and second seal lines, the first seal line extending along the length of the supply channel and sealing the top of the channel;

water inlets disposed in the top of the supply channel, the inlets formed between the tape sides by equally spaced interruptions in the first seal line;

a plurality of pressure channels disposed on top of the supply channel and parallel thereto, the pressure channels formed between the first seal line and second seal line, one end of each pressure channel communicating with each water inlet;

a plurality of diffuser cavities disposed on top of the supply channel and formed between the first seal line and second seal line, one end of each diffuser cavity communicating with another end of the pressure channels; and water outlets disposed in the top of the diffuser cavities formed in the top of the diffuser cavities and formed between the tape sides, the water outlets equally spaced along the length of the plastic tape.

2. A watering device for watering row crops such as fruits, vegetables, plants and similar applications, the device adapted for connection to a water source, the device comprising:

an elongated supply channel having one end connected to the water source for receiving water therefrom;

a water inlet disposed in the supply channel;

an elongated pressure channel having one end communicating with the water inlet and receiving water from the inlet;

a diffuser cavity communicating with another end of the pressure channel and reducing the water pressure as it is received therein;

a water outlet disposed in the diffuser cavity, the outlet drip feeding water into adjacent soil during the operation of the device; and a vertical stabilizer cavity disposed in the top of the supply channel and communicating therewith for receiving water under pressure therein and holding the pressure channel and diffuser cavity upright above the supply channel during the operation of the device.

3. The device as described in claim 2 further including a plurality of pressure channels disposed above and parallel to the length of the supply channel, the pressure channels having one end communicating with water inlets disposed along the top of the supply channel and in a spaced relationship to each other, the pressure channels having another end communicating with diffuser cavities for receiving water from the pressure channels, the diffuser cavities having water outlets disposed in the top thereof, the outlets indexed along the length of the device and in a spaced relationship to each other to correspond with the proper plant or plant seed spacing in the row crop.

4. The device as described in claim 3 further including a plurality of vertical stabilizer cavities, the cavities disposed adjacent the diffuser cavities and communicating with the supply channel for receiving water under pressure therein, the stabilizer cavities holding the pressure channels and diffuser cavities upright above the supply channel during the operation of the device.

5. A watering device for watering row crops such as fruits, vegetables, plants and similar applications, the device adapted for connection to a water source, the device comprising:

an elongated supply channel for receiving water therefrom;

a plurality of water inlets disposed in a spaced relationship to each other in the top of the supply channel;

a plurality of pressure channels, each of the channels having one end communicating with one of the water inlets and receiving water from the inlets;

a plurality of diffuser cavities, each of the cavities communicating with another end of the pressure channels for receiving water from the pressure channels and reducing the water pressure as it is received therein;

water outlets disposed in the top of each of the diffuser cavities, the outlets drip feed water into adjacent soil during the operation of the device; and a plurality of vertical stabilizer cavities, the cavities disposed adjacent the diffuser cavities and communicating with the supply channel for receiving water under pressure therein, the stabilizer cavities holding the pressure channels and diffuser cavities upright above the supply channel during the operation of the device.

6. The watering device as described in claim 5 wherein the pressure channels are disposed on top of the supply channel and extending along the length thereof.

7. A watering device for watering row crops such as fruits, vegetables, plants and similar applications, the device adapted for connection to a water source, the device comprising:

an elongated supply channel formed in the lower portion of a folded plastic tape, the sides of the tape extending and joined together by first and second seal lines, the first seal line extending along the length of the supply channel and sealing the top of the channel;

water inlets disposed in the top of the supply channel, the inlets formed between the tape sides by equally spaced interruptions in the first seal line;

a plurality of pressure channels disposed on top of the supply channels formed between the first seal line and second seal line, one end of each pressure channel communicating with each water inlet;

a plurality of diffuser cavities disposed on top of the supply channel and formed between the first seal line and second seal line, one end of each diffuser cavity communicating with another end of the pressure channels;

water outlets disposed in the top of the diffuser cavities formed in the top of the diffuser cavities and formed between the tape sides, the water outlets equally spaced along the length of the plastic tape; and vertical stabilizer cavities formed in the top of the supply channel and communicating therewith for receiving water pressure therein, sides and top of each cavity formed by the first seal curving upwardly and downwardly in an inverted "V" shape, the stabilizer cavities holding the pressure channels and diffuser cavities upright above the supply channel during the operation of the device.

* * * * *